United States Patent
Yokota et al.

(10) Patent No.: US 9,145,808 B2
(45) Date of Patent: Sep. 29, 2015

(54) INJECTOR CONTROL METHOD

(71) Applicant: HINO MOTORS, LTD., Hino-shi (JP)

(72) Inventors: Haruyuki Yokota, Tokyo (JP);
Takaharu Shimizu, Tokyo (JP);
Tomoaki Shiratori, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 14/355,368

(22) PCT Filed: Nov. 28, 2012

(86) PCT No.: PCT/JP2012/007613
§ 371 (c)(1),
(2) Date: Apr. 30, 2014

(87) PCT Pub. No.: WO2013/080525
PCT Pub. Date: Jun. 6, 2013

(65) Prior Publication Data
US 2014/0325961 A1     Nov. 6, 2014

(30) Foreign Application Priority Data

Nov. 29, 2011 (JP) ................................ 2011-259679

(51) Int. Cl.
*F01N 3/00* (2006.01)
*F01N 3/10* (2006.01)
*F01N 3/20* (2006.01)
*F01N 11/00* (2006.01)

(52) U.S. Cl.
CPC ................ *F01N 3/208* (2013.01); *F01N 11/00* (2013.01); *F01N 2550/05* (2013.01); *F01N 2610/02* (2013.01); *F01N 2610/144* (2013.01); *F01N 2610/146* (2013.01); *F01N 2900/1808* (2013.01); *Y02T 10/24* (2013.01); *Y02T 10/47* (2013.01)

(58) Field of Classification Search
CPC ..... F01N 3/208; F01N 11/00; F01N 2610/02; F01N 2610/144; F01N 2610/146
See application file for complete search history.

(56) References Cited

U.S. PATENT DOCUMENTS

2009/0277162 A1* 11/2009 Cominetti et al. .............. 60/297
2010/0122521 A1* 5/2010 Sun et al. ........................ 60/284

(Continued)

FOREIGN PATENT DOCUMENTS

JP    2007-000782    1/2007
JP    2008-101564    5/2008

(Continued)

OTHER PUBLICATIONS

International Search Report issued Feb. 19, 2013, in PCT/JP12/007613, filed Nov. 28, 2012.

*Primary Examiner* — Audrey K Bradley
(74) *Attorney, Agent, or Firm* — Oblon, McClelland, Maier & Neustadt, L.L.P.

(57) ABSTRACT

Disclosed is a control method for restoring temporary malfunction of an injector 8 for adding urea water 12 into exhaust gas due to adhesion of urea crystals. A passage is laid out such that the passage (suction line 14) for feed of the urea water 12 runs downward from above of and is connected to the injector 8. When the injector 8 is determined to be in malfunction, an operation of temporarily sucking back the urea water 12 in the passage (suction line 14) is interposed before the pump 13 is stopped; the pump 13 is restarted after lapse of a predetermined time to re-determine whether the injector 8 is in malfunction or not.

3 Claims, 5 Drawing Sheets

(56) References Cited

U.S. PATENT DOCUMENTS

2011/0099983 A1    5/2011  Ohno
2011/0107742 A1    5/2011  Igarashi et al.
2012/0020857 A1*   1/2012  Isada et al. .................... 423/212
2012/0073264 A1*   3/2012  Li et al. .......................... 60/274

FOREIGN PATENT DOCUMENTS

| JP | 2011-117440 | 6/2011 | |
| JP | 2011-117441 | 6/2011 | |
| JP | 2011-247136 | 12/2011 | |
| WO | WO 2006064028 A1 * | 6/2006 | ................ F01N 3/20 |

* cited by examiner

INJECTOR CONTROL METHOD

TECHNICAL FIELD

The present invention relates to an injector control method.

BACKGROUND ART

It has been recently considered that a particulate filter is incorporated in an exhaust pipe to collect particulates in exhaust gas, and a selective reduction catalyst capable of selectively reacting $NO_x$ with ammonia even in the presence of oxygen is arranged downstream of the particulate filter, urea water as a reducing agent being added at between the particulate filter and the selective reduction catalyst, thereby achieving simultaneous reduction of the particulates and $NO_x$.

In such a case, the addition of the urea water to the selective reduction catalyst is at between the particulate filter and the selective reduction catalyst. Thus, in order to secure a sufficient reaction time for thermal decomposition of the added urea water into ammonia and carbon dioxide gas, a distance is to be lengthened from a urea-water adding position to the selective reduction catalyst. There is, however, a problem that the spaced-apart arrangement of the particulate filter and the selective reduction catalyst with a sufficient distance in between would significantly impair a mountability on a vehicle.

Accordingly, devised was an exhaust emission control device as shown in FIG. 1 comprising a particulate filter 3 for capture of particulates in exhaust gas 1 from an engine and a selective reduction catalyst 4 downstream of the particulate filter 3 and having a property capable of selectively reacting $NO_x$ with ammonia even in the presence of oxygen. The particulate filter 3 and the selective reduction catalyst 4 are encased by casings 5 and 6, respectively, and incorporated in parallel with each other in an exhaust pipe 2 through which the exhaust gas 1 from the engine flows; and an exit end of the particulate filter 3 is connected with an entry end of the selective reduction catalyst 4 through an S-shaped communication passage 7 so that the exhaust gas 1 discharged from the exit end of the particulate filter 3 is turned back in an opposite direction and is guided to the entry end of the adjacent selective reduction catalyst 4.

The communication passage 7 is the S-shaped structure comprising a gas gathering chamber 7A encompassing the exit end of the particulate filter 3 to gather the exhaust gas 1 just discharged from the exit end through substantially perpendicular turnabout, a mixing pipe 7B for extraction of the gathered exhaust gas 1 in the chamber 7A in a direction opposite to that of the exhaust gas flow in the particulate filter 3 and a gas dispersing chamber 7C for dispersion of the exhaust gas 1 from the mixing pipe 7B through substantially perpendicular turnabout and for encompassing the entry end of the selective reduction catalyst 4 to guide the dispersed exhaust gas 1 into the entry end of the catalyst. The entry end of the mixing pipe 7B is centrally provided with a urea water adding injector 8 for addition of the urea water into the mixing pipe 7B and directed to the exit end of the mixing pipe 7B.

In the example illustrated, an oxidation catalyst 9 is installed in the casing 5 before the particulate filter 3 to perform an oxidation treatment of unburned fuel in the exhaust gas 1. An ammonia reducing catalyst 10 is installed in the casing 6 after the selective reduction catalyst 4 to perform an oxidation treatment of surplus ammonia.

With such a configuration employed, the particulates in the exhaust gas 1 are captured by the particulate filter 3; and, downstream thereof, the urea water is added in the exhaust gas 1 midway of the mixing pipe 7B by the urea water adding injector 8 and is thermally decomposed into ammonia and carbon dioxide; then, on the selective reduction catalyst 4, $NO_x$ in the exhaust gas 1 is well reduced and purified by the ammonia. As a result, the simultaneous reduction of the particulates and $NO_x$ in the exhaust gas 1 are achieved.

In this case, the fact that the exhaust gas 1 discharged from the exit end of the particulate filter 3 is turned around in the opposite direction by the communication passage 7 and then guided to the entry end of the adjacent selective reduction catalyst 4 ensures a long distance from the added position of the urea water to the selective reduction catalyst 4 and thus ensures a sufficient reaction time for production of ammonia from the urea water.

Moreover, the fact that the particulate filter 3 and the selective reduction catalyst 4 are arranged in parallel with each other and the communication passage 7 is arranged between and alongside of the particulate filter 3 and selective reduction catalyst 4 makes an overall configuration compact in size, thereby substantially improving the mountability on the vehicle.

In the urea water adding injector 8 provided in the exhaust emission control device as mentioned in the above, urea crystals may precipitate in a nozzle of the injector under specific conditions such as sudden stop of the engine having been in operation with high exhaust temperature, which may bring about temporary malfunction of failed urea-water injection due to adhesion of the precipitating urea crystals.

Specifically, upon stop of the engine, a countermeasure is taken for prevention of the urea water from freezing, for example, during the stop of the engine in a cold district by purging the urea water to the urea water tank as soon as an ignition key is turned off (see, for example, undermentioned Patent Literature 1). As a result, at a next start of the engine, the injector 8 is to be idly operated for expulsion of the air in the passage followed by feed of the urea water.

When the nozzle of the injector 8 is clogged with the urea crystals in this case, air expulsion by the idle operation may fail into a situation that the urea water from the pump advancing while compressing the air does not arrive at the injector 8 so that the urea water cannot reach the nozzle of the injector 8 so as to dissolve the urea crystals.

In such situation, conventionally conducted are repeated operations such that the pump for feed of the urea water is temporarily stopped to reduce the pressure in the urea-water passage and the pump is restarted after lapse of a predetermined time to conduct pilot injection. Thus, the depressurization and pressurization are alternately repeated so as to resolve the clogging of the urea crystals and thus revive the injector 8.

CITATION LIST

Patent Literature

[Patent Literature 1] JP 2008-101564A

SUMMARY OF INVENTION

Technical Problems

However, when the adhesion of the urea crystals in the nozzle of the injector 8 is high in degree, mere the repeated depressurization and pressurization through intermittent operation of the pump may not enough for sufficient revival so that, in spite of the temporary trouble inherently resolvable into normal operational status of the injector 8 through easy dissolution of the urea crystals by contact with the urea water, repeated malfunction of the injector 8 is disadvantageously diagnosed as abnormality of the injector 8 by self-diagnosis performance of a vehicle.

The invention was made in view of the above and has its object to promptly resolve temporary malfunction of an injector due to adhesion of urea crystals.

Solution to Problems

The invention is directed to a control method for resolving temporary malfunction of an injector for adding urea water into exhaust gas due to adhesion of urea crystals, characterized in that a urea water feed passage is laid out such that said passage runs downward from above of and is connected to said injector and that when the injector is determined to be in malfunction, an operation of temporarily sucking back the urea water in the passage is interposed before a pump is stopped, the pump being restarted after lapse of a predetermined time to re-determine whether the injector is in malfunction or not.

Thus, in a case such as sudden stop of the engine having been in operation with high exhaust temperature, temporary malfunction of failed urea-water injection may occur due to urea crystals precipitating in and adhering to a nozzle of the injector, which may bring about a situation where an idle operation of the injector at a next start of the engine for expulsion of the air in the passage followed by feed of the urea water may fail and result in the urea water fed by the pump being unreachable to the injector. However, when the injector is determined to be in malfunction, the operation of temporarily sucking back the urea water in the passage is interposed before the pump is stopped, and the pump is restarted after lapse of the predetermined time to re-determine whether the injector is in malfunction or not, which greatly shakes an interface between the urea water and the air in the passage and facilitates displacement of the urea water with the air.

Specifically, the air with relatively low specific gravity tends to flow up in the passage and in displacement thereof the urea water tends to flow down in the passage to the injector, so that the urea water has a substantially increased chance of arriving at the inside of the nozzle of the injector. The very arrival of the urea water at the inside of the nozzle of the injector brings about dissolution of the urea crystals adhering in the nozzle, thereby reviving the injector into a normal operational status.

It is preferable in the invention that a pressure of the urea water is increased to a predetermined pressure by the pump before pilot injection of the urea water is conducted, the injector being determined to be in malfunction when no pressure drop occurs in the pilot injection. Further, it is preferable that the injector is determined to be abnormal when the injector is repeatedly determined to be in malfunction by a predetermined number of counts.

Advantageous Effects of Invention

According to the injector control method of the invention mentioned in the above, various excellent effects can be obtained. For example, the operation of temporarily sucking back the urea water in the passage is interposed before the pump is stopped, and the pump is restarted after lapse of a predetermined time, so that the interface between the urea water and the air in the passage is greatly shaken and displacement of the urea water with the air can be facilitated. As a result, the air flows up in the passage and in replacement thereof the urea water flows down in the passage to the injector to dissolve the urea crystals, so that the temporary malfunction of the injector due to the adhesion of the urea crystals can be promptly resolved and a frequency at which abnormality of the injector is diagnosed by self-diagnosis performance of a vehicle can be substantially reduced.

DESCRIPTION OF EMBODIMENT

Next, an embodiment of the invention will be described in conjunction with the drawings.

Figure 1:
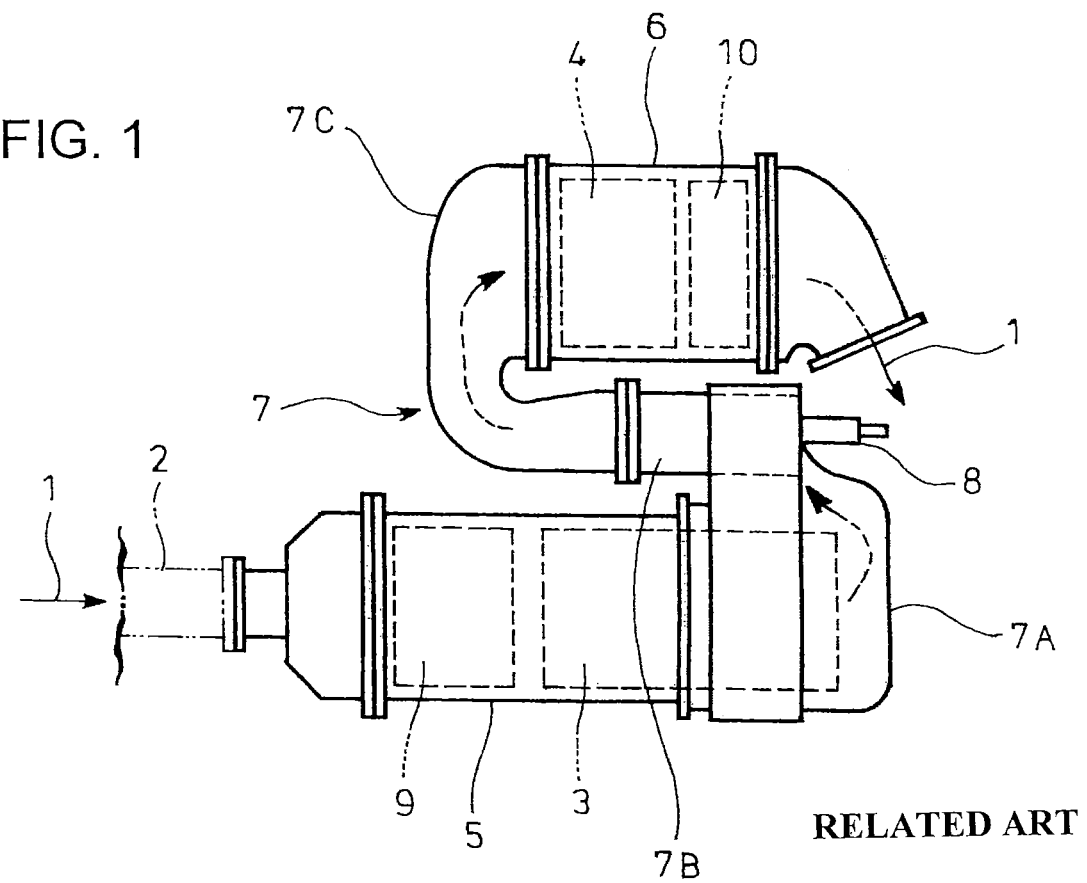
FIG. 1 is a schematic view showing an example of conventional exhaust emission control devices.
Figure 2:
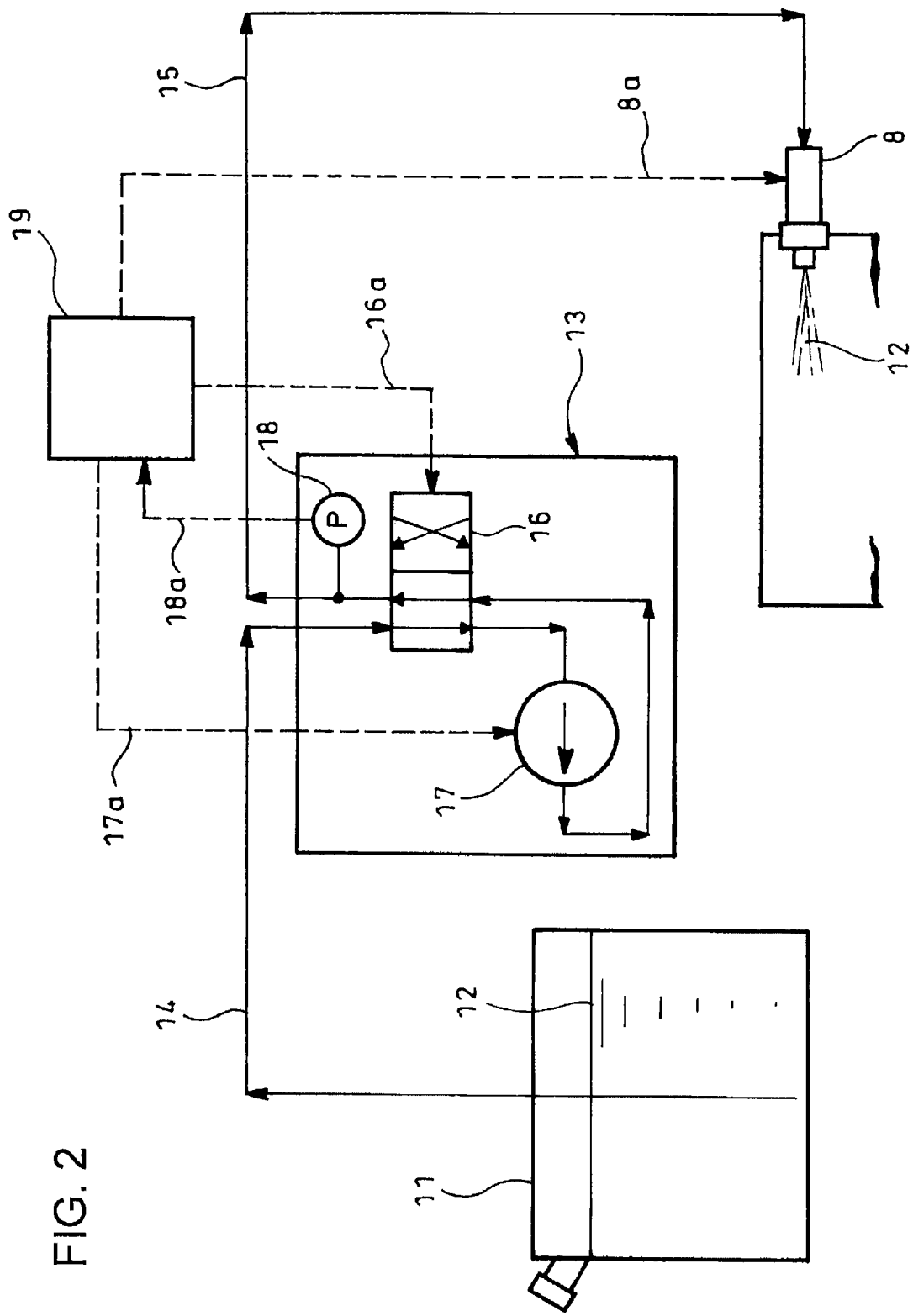
FIG. 2 is a systematic diagram showing an embodiment of the invention.
Figure 3:
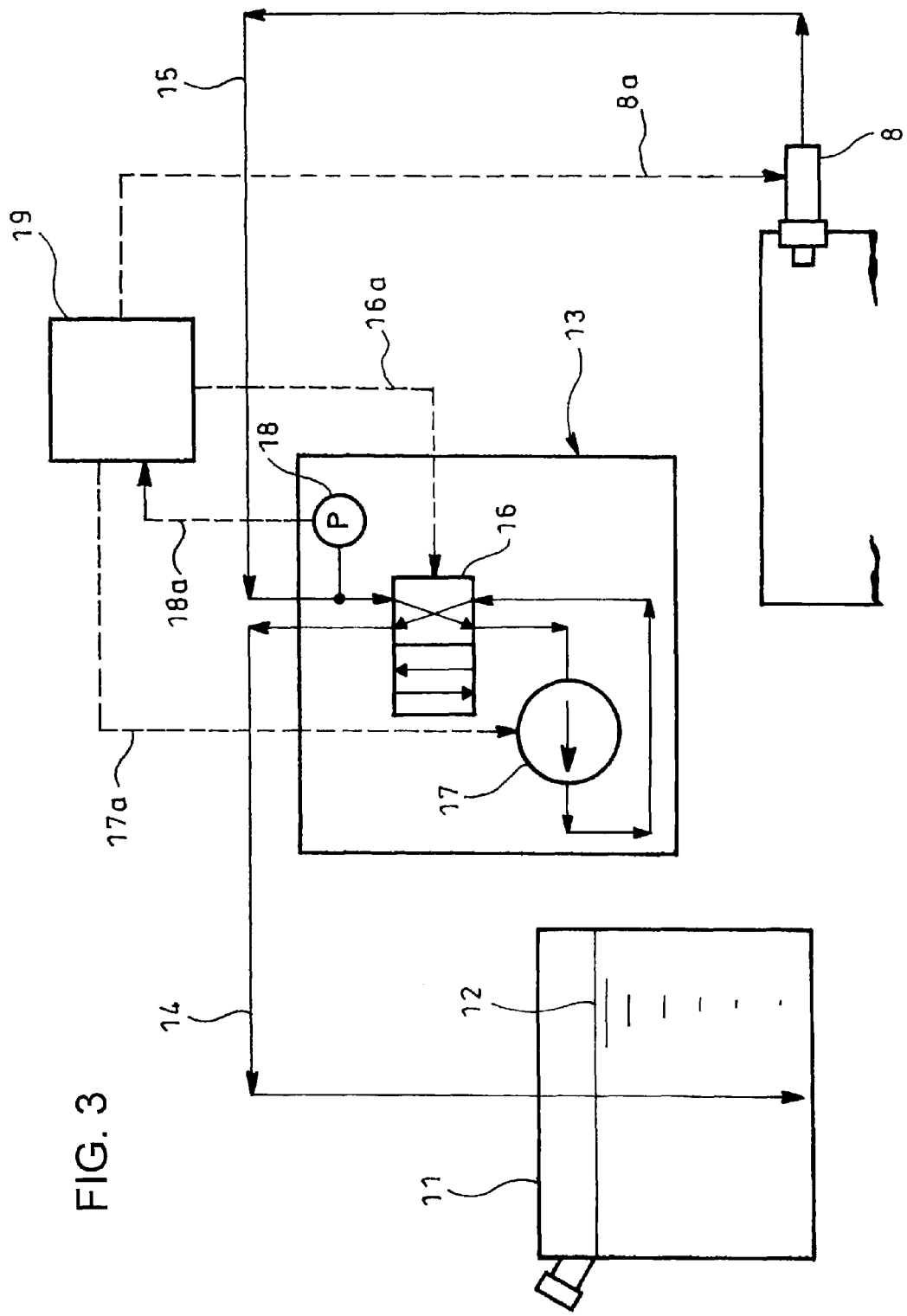
FIG. 3 is a systematic diagram showing an operation of sucking back the urea water by the pump of FIG. 2.

FIGS. 2-5 show the embodiment of the invention. In FIG. 2, reference numeral 11 denotes a urea water tank for storage of urea water 12; and 13, a pump which pumps up the urea water 12 from the urea water tank 11 through a suction line 14 and feeds the urea water 12 to an injector 8 through a pressure line 15.

The pressure line 15 providing a passage for feed of the urea water 12 to the injector 8 is laid out such that the passage runs downward from above of and is connected to the injector 8.

The pump 13 for feed of the urea water 12 to the injector 8 comprises a flow changeover valve 16 switchable into normal and reverse positions and a pump body 17 substantially responsible for suck and discharge of the urea water 12. By switching the flow changeover valve 16 from the position in FIG. 2 into the position in FIG. 3, the urea water 12 in the pressure line 15 can be sucked back by the pump body 17.

Specifically, upon the stop of the engine, a countermeasure is taken for prevention of the urea water from being frozen, for example, during the stop of the engine in a cold district by switching the flow changeover valve 16 into the reversed position (the position shown in FIG. 3) as soon as the ignition key is turned off, and purging the urea water 12 to the urea water tank 11 through driving of the pump body 17.

In the pump 13, a pressure sensor 18 is provided to detect pressure of the urea water 12 in the pressure line 15. A detection signal 18*a* from the pressure sensor 18 is inputted to a controller 19 which controls the operations of the injector 8, the flow changeover valve 16 and the pump body 17 by control signals 8*a*, 16*a* and 17*a*, respectively, and determination whether the injector 8 is in malfunction or not is made on the basis of a value detected by the pressure sensor 18.

Figure 4:
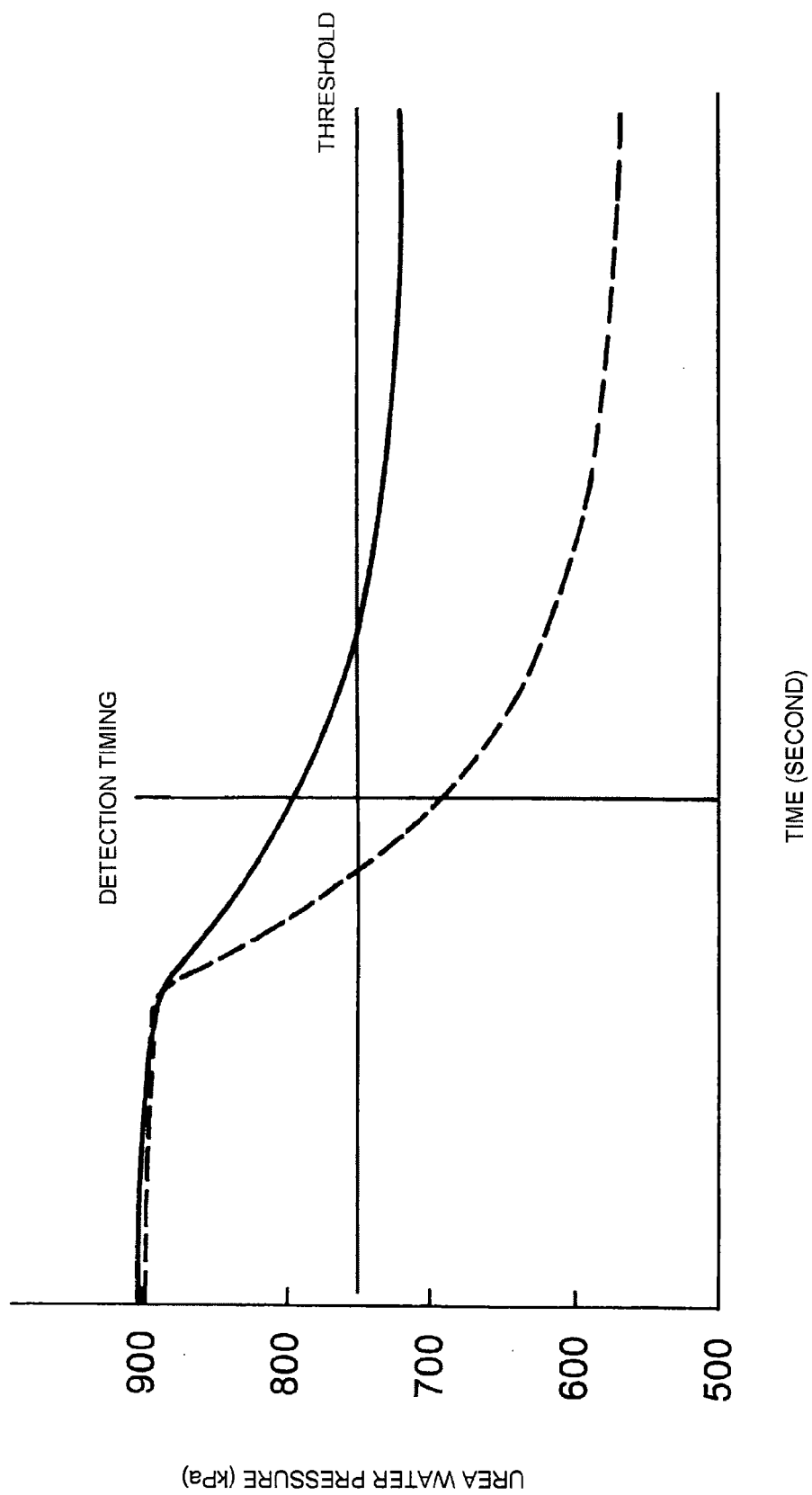
FIG. 4 is a graph for explanation of how to determine the injector to be in malfunction.

Specifically, as shown in the graph of FIG. 4 by solid curve, the urea water 12 in the suction line 14 is boosted in pressure by the pump 13 to a predetermined pressure (900 kPa in the example of FIG. 4) and then the nozzle of the injector 8 is fully opened to conduct pilot injection. When pressure drop below a predetermined level (pressure drop below a threshold in FIG. 4) is not observed at an appropriate detection timing after the injection, the injector 8 is determined to be in malfunction.

When the operation of the injector 8 is normal, the pressure drop below the predetermined level (pressure drop below the threshold in FIG. 4) by the injection of the urea water 12 occurs as shown in dotted curves in the graph of FIG. 4. The pressure drop below the threshold in FIG. 4 can be confirmed at the appropriate detection timing after the injection.

Figure 5:
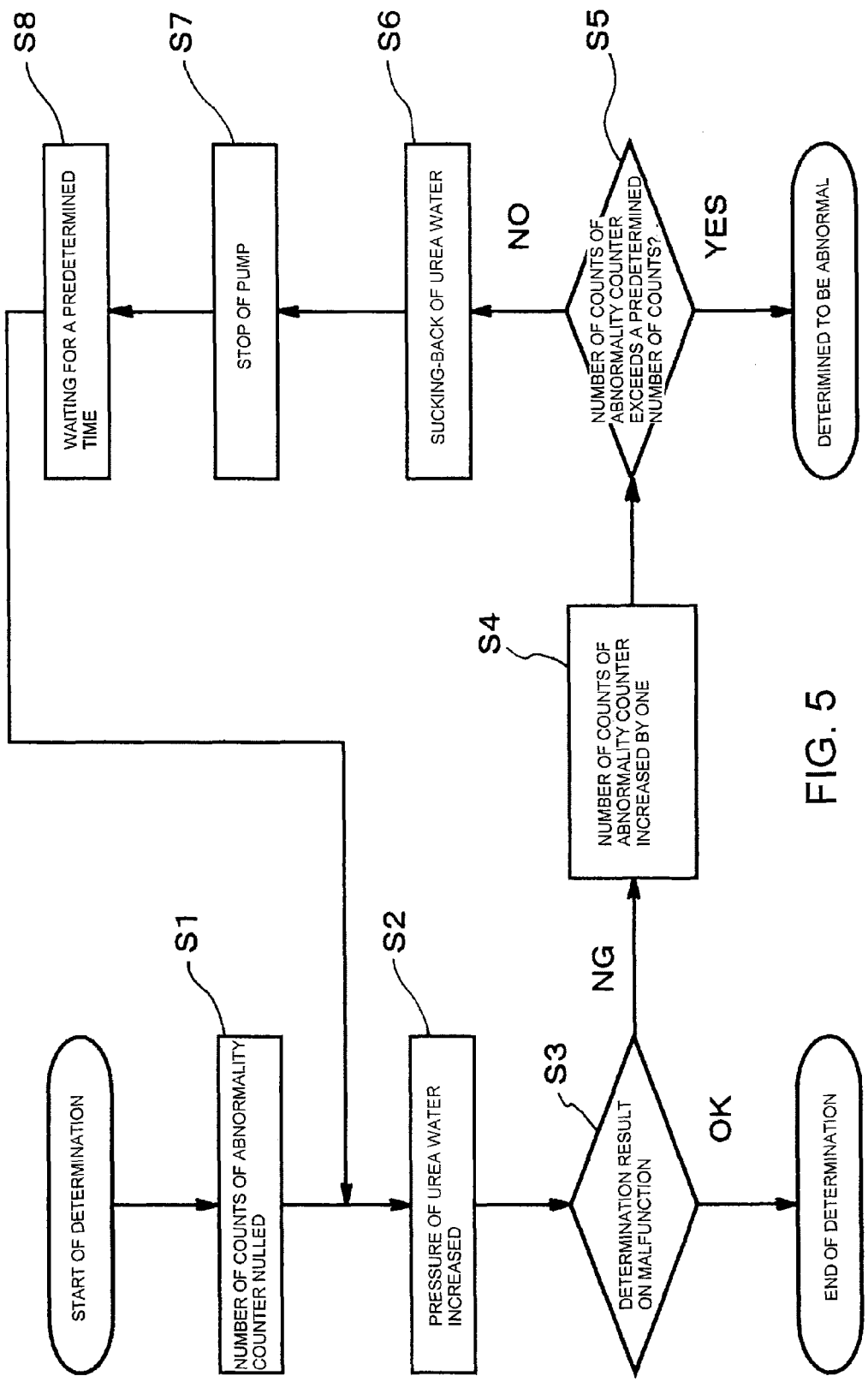
FIG. 5 is a flowchart showing specific control steps in the controller of FIG. 2.

In the controller 19, when the injector 8 is determined to be in temporary malfunction due to adhesion of the urea crystals, the countermeasure is taken in accordance with a flowchart as shown in FIG. 5 so as to promptly restore the temporary malfunction of the injector 8 due to adhesion of the urea crystals.

Specific control steps in the controller 19 are detailed below. Firstly, in step S1, a number of counts of the abnormality counter is nulled. Then, in step S2, the pump 13 is driven to boost in pressure the urea water 12 in the suction line 14 up to a predetermined pressure (900 kPa in the example of FIG. 4). Next, in step S3, pilot injection of the injector 8 is conducted to determine whether the injector 8 is in malfunction or not depending on degree of the pressure drop as mentioned above. When the injector 8 is determined to be normal in operation, the determination is ended.

On the other hand, when the injector 8 is determined to be in malfunction, the procedure proceeds to step S4 where a number of counts in abnormality counter is increased "by one". When the number of determination counts of abnormality counter does not exceed a predetermined number of counts (for example, 10) in next step S5, the procedure proceeds to step S6 where the flow changeover valve 16 is switched to the reverse position (position in FIG. 3) and the pump 13 is driven to conduct an operation of temporarily sucking back the urea water 12 in the pressure line 15.

However, in the operation of sucking back the urea water 12, the urea water 12 in the pressure line 15 is not purged to the urea water tank 11 unlike upon the stop of the engine; it suffices that the urea water 12 is sucked back in the pressure line 15 by a short distance.

After the operation of sucking back the urea water 12 is conducted, it proceeds to step S7 where the pump 13 is stopped. Then, it proceeds to step S8 where waiting is made for a predetermined time and then it returns to step S2 where the pump 13 is restarted to re-determine whether the injector 8 is in malfunction or not.

When the number of counts of the abnormality counter in excess of a predetermined number of counts (for example, 10) is confirmed in step 5, it turns out that abnormality of the injector 8 is diagnosed by self-diagnosis performance of a vehicle.

Thus, precipitation and adhesion of urea crystals in and to the nozzle of the injector 8 in the case such as abrupt stop of the engine having been in operation with high exhaust temperature may result in temporary malfunction of failed injection of the urea water 12 and thus, at a next start of the engine, the idle operation of the injector 8 for expulsion of the air in the pressure line 15 followed by feed of the urea water 12 may fail into the situation that the air in the pressure line 15 is not expelled and thus the urea water 12 fed by the pump 13 does not arrive at the injector 8. However, when the injector 8 is determined to be in malfunction, the operation of temporarily sucking back the urea water 12 in the pressure line 15 is interposed before the pump 13 is stopped, and the pump 13 is restarted after lapse of a predetermined time to re-determine whether the injector 8 is in malfunction or not, so that the interface between the urea water 12 and air in the pressure line 15 is greatly shaken and the displacement of the urea water 12 with the air is facilitated.

Specifically, the air relatively low in specific gravity tends to flow up in the pressure line 15 and in replacement thereof the urea water 12 tends to flow down in the pressure line 15 to the injector 8, so that the urea water 12 has a substantially enhanced chance of arriving at inside of the nozzle of the injector 8. The very arrival of the urea water 12 at the inside of the nozzle of the injector 8 will bring about dissolution of the urea crystals adhering in the nozzle, thereby reviving the injector 8 into normal operational status.

Thus, according to the above-mentioned embodiment, the operation of temporarily sucking back the urea water 12 in the pressure line 15 is intervened before the pump 13 is stopped, and the pump 13 is restarted after lapse of a predetermined time, so that the interface between the urea water 12 and the air in the pressure line 15 is greatly shaken and the displacement of the urea water 12 with the air is facilitated. As a result, the air flows up in the pressure line 15 and in replacement thereof the urea water 12 flows down in the pressure line 15 to the injector 8 to dissolve the urea crystals, so that temporary malfunction of the injector 8 due to the adhesion of the urea crystals can be promptly restored, and the frequency at which abnormality of the injector 8 is diagnosed by self-diagnosis performance of a vehicle can be substantially reduced.

REFERENCE SIGNS LIST 1 exhaust gas
11 urea water tank
12 urea water
13 pump
14 suction line (passage for feed of urea water to injector)

The invention claimed is:

1. A control method for resolving temporary malfunction of an injector for adding urea water into exhaust gas due to adhesion of urea crystals on the injector, the method comprising:
   feeding urea water to the injector from a urea water feed passage which is oriented above the injector,
   determining if the injector is malfunctioning,
   if the injector is determined to be malfunctioning, temporarily sucking back the urea water in the passage before a pump is stopped,
   after the lapse of a predetermined time, restarting the pump to re-determine whether the injector is still malfunctioning or not, and
   determining the injector to be abnormal when the injector is repeatedly determined to be malfunctioning by a predetermined number of counts.

2. A control method for resolving temporary malfunction of an injector for adding urea water into exhaust gas due to adhesion of urea crystals on the injector, the method comprising:
   feeding urea water to the injector from a urea water feed passage which is oriented above the injector,
   determining if the injector is malfunctioning,
   if the injector is determined to be malfunctioning, temporarily sucking back the urea water in the passage before a pump is stopped,
   after the lapse of a predetermined time, restarting the pump to re-determine whether the injector is still malfunctioning or not,
   increasing a pressure of the urea water to a predetermined pressure by the pump before a pilot injection of the urea water is conducted, and
   determining the injector to be malfunctioning when no pressure drop occurs in the pilot injection.

3. The injector control method as claimed in claim 2, further comprising:

determining the injector to be abnormal when the injector is repeatedly determined to be malfunctioning by a predetermined number of counts.

* * * * *